United States Patent [19]

Florian

[11] Patent Number: 5,270,871
[45] Date of Patent: Dec. 14, 1993

[54] STAND UP PRACTICE MIRROR

[76] Inventor: Raymond J. Florian, 14440 Elwell Rd., Belleville, Mich. 48111

[21] Appl. No.: 869,966

[22] Filed: Apr. 17, 1992

[51] Int. Cl.$^5$ .......................... G02B 5/08; G02B 7/18
[52] U.S. Cl. .................................. 359/870; 359/871; 359/838; 248/469; 248/472; 434/257
[58] Field of Search ............... 359/838, 870, 871, 872; 248/469, 472, 473, 474; 434/247, 257

[56] References Cited

U.S. PATENT DOCUMENTS

| | | | |
|---|---|---|---|
| 1,832,248 | 11/1931 | Schrader | 359/838 |
| 3,353,282 | 11/1967 | Sneed | 434/257 |
| 4,083,559 | 4/1978 | Owen, Jr. | 359/872 |
| 4,693,570 | 9/1987 | Kryder | 359/855 |
| 5,015,084 | 5/1991 | Kryder | 359/838 |

Primary Examiner—Bruce Y. Arnold
Assistant Examiner—R. D. Shafer
Attorney, Agent, or Firm—Harness, Dickey & Pierce

[57] ABSTRACT

The present invention provides for an athletic skill practice mirror which is light weight and relatively portable. The mirror can have an alignment image whereby a participant can stand in front of the practice mirror and compare his reflective image with that of the alignment image to detect and correct improper body alignment.

16 Claims, 1 Drawing Sheet

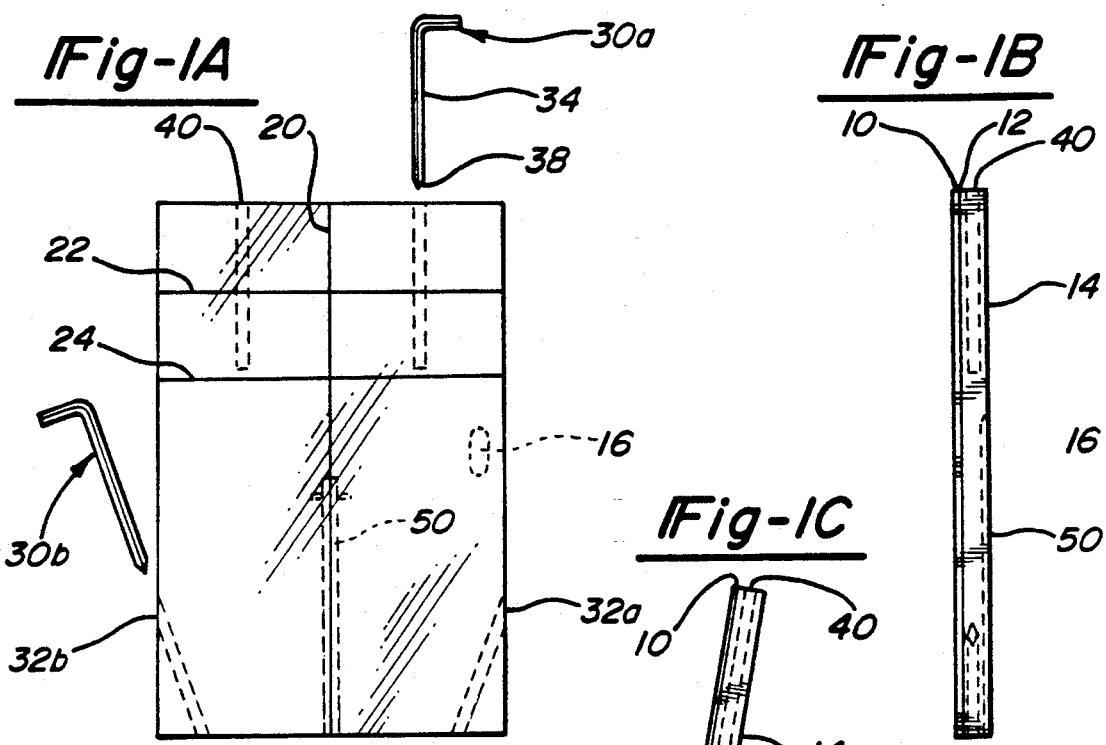
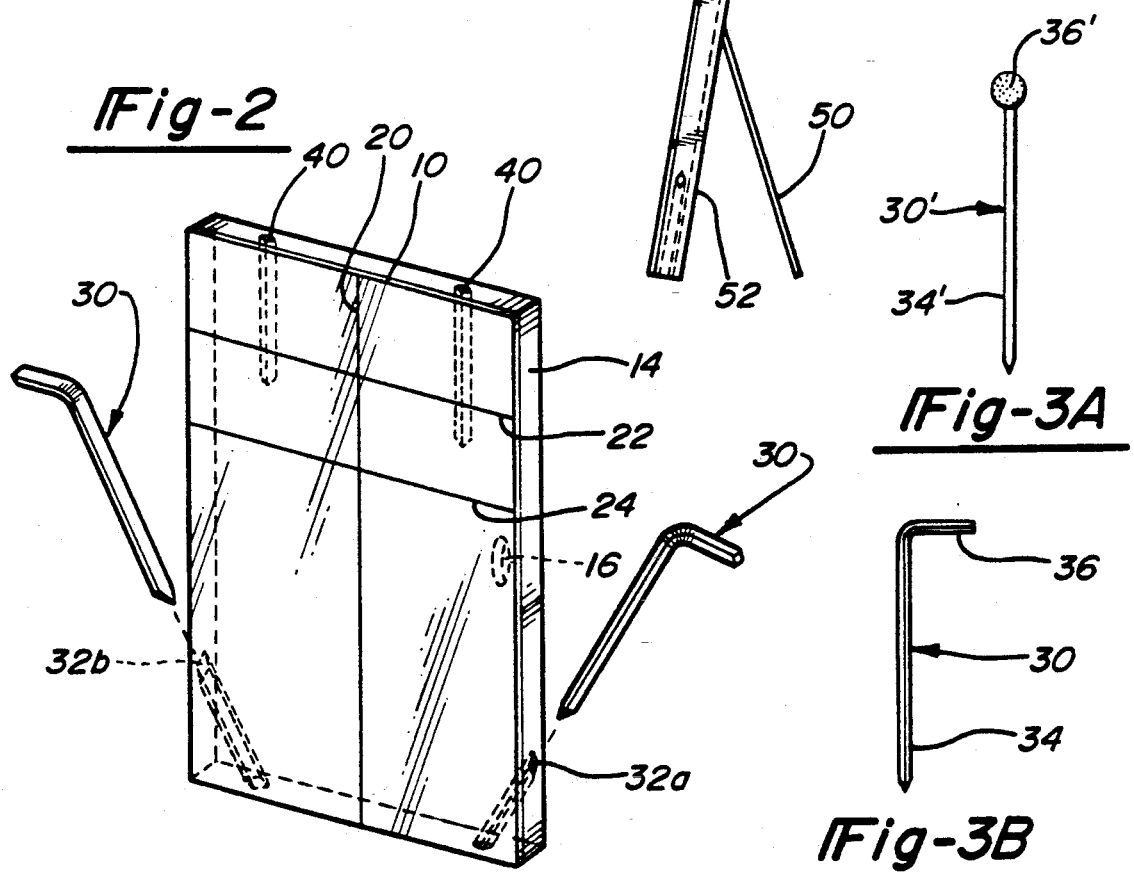

5,270,871

STAND UP PRACTICE MIRROR

BACKGROUND OF THE INVENTION

This invention relates generally to a device for improving athletic skills, and more particularly to a full view practice mirror for observing and correcting improper body alignment in a variety of athletic activities.

For those involved in athletic endeavors such as sports, aerobic dancing and the like, whether at a professional or amateur level, being able to improve one's athletic skills is a constant challenge. Trainers are often hired for their ability to observe athletic behavior, detect flaws in that behavior, and provide constructive criticism as to how to improve one's athletic ability. However, not everyone can afford the expense and/or time to engage a personal trainer or even attend classes. Thus, these people are forced to rely on self-help methods of improving their skill. Even for those able to engage a trainer, it is advantageous for the participant to still practice when the trainer is not there. Thus, regardless of the participants' resources, there comes times when the participant must be able to practice his skills by himself, without the benefit of a third party observing his behavior and providing constructive criticism as necessary. During these times, it would be helpful if the participant could view his own behavior as he practices the athletic event. In this way, the participant could observe instances of incorrect body alignment which cause poor performance, while also being able to observe those behaviors that result in good performance.

In order for an athletic participant to be able to practice by himself while still having the benefit of being able to observe his behavior and to correct any improper body alignment, an apparatus should be provided which is relatively inexpensive, easy to use, durable and readily portable. For example, while an athletic participant could very well position a movie camera and film his behavior while practicing, such an elaborate set-up is expensive and cumbersome. Also, such a system has the disadvantage of not readily providing instantaneous feedback to the participant. Therefore, it would be advantageous to provide for a means by which the athletic participant can view his behavior while practicing.

SUMMARY OF THE INVENTION

It is therefore an object of the present invention to provide for a practice mirror for improving athletic skills where the mirror allows the participant to view his reflection. The mirror also provides for image alignment means such that the participant, in certain activities, can compare the alignment of his reflection with an ideal alignment. The practice mirror also includes support means so that the mirror can be maintained in a selected upright position in front of the athlete.

BRIEF DESCRIPTION OF THE DRAWINGS

The present invention can be better understood by referencing the following description of the presently preferred embodiment in conjunction with the drawings in which:

FIG. 1A is a front elevational view a practice mirror embodying features of the present invention;

FIGS. 1B and 1C are side views of the mirror of FIG. 1A;

FIG. 2 is a perspective exploded view of the mirror of FIG. 1A and the manner in which it is supported in an upright position; and FIGS. 3A and 3B illustrate support stakes.

DESCRIPTION OF THE PRESENTLY PREFERRED EMBODIMENT

As can be seen in FIGS. 1A, 1B and 1C, the practice mirror includes a generally planar front member 10 using a reflective surface 12 mounted to a supportive backing 14. More particularly, in one form of the invention, the front member 10 is made up of a clear acrylic compound with a reflective backing, the acrylic compound being preferable because it is relatively break-resistant. In this embodiment, polyethyl teraphthelate, commonly called PET, is used. Also, in one form of the invention, the supportive backing 14 is made up of extruded polystyrene insulation; this material being selected because of its relatively light weight and strong characteristics. The practice mirror is generally rectangular in shape being about 4 feet long and 2 feet wide. The front member 10 is approximately one eighth inch thick while the supportive backing 14 is approximately two inches thick, making the whole assembly approximately two and one eighth inches thick. On the back side of the mirror, an indentation, or notch, 16 is provided in the supportive backing 14 for use as a carrying hand grip. Also on the back side of the mirror, a pivotally attached support leg 50 can be provided, as will be described in greater detail later.

On the front of the reflective surface 12, a vertical stance line 20 is scribed. Also scribed on the front of the reflective surface 12 are two horizontal lines, an upper body alignment line 22 and a lower body alignment line 24. The stance line 20 is scribed vertically at the middle of the reflective surface 12, while the upper body alignment line 22 is approximately six inches from the upper edge of the reflective surface 12 and the lower body alignment line 24 is spaced six inches from the upper body alignment line 22, thereby making the lower body alignment line 24 approximately twelve inches from the top of the reflective surface 12. These lines 20–24 create an alignment image against which the participant can compare his body alignment. By standing in front of the practice mirror and going through the motions of a particular athletic event (i.e. swinging a tennis racket), the athlete can view his reflection in relation to the alignment image created by the stance line 20 and upper and lower body alignment lines 22,24. The alignment image created by these lines 20-24 provides the participant with an ideal against which to gauge his body positioning and movement. In this respect, the size of the mirror is such that the participant can get a full body view when standing in front of it, yet the mirror is sufficiently compact and light weight to allow the athlete to easily transport the mirror to wherever he needs to go to practice. In one form of the invention the mirror weighs around seven pounds.

Included in this preferred embodiment are two support stakes 30a,30b which can be inserted through staking holes 32a and 32b through the supportive backing 14 into the ground, as illustrated in FIGS. 1A and 2. The support stakes 30a,b are made of L-shaped square steel rod, having a staking leg portion 34 approximately fifteen and one half inches long and a handle 36 approximately four inches long. The end 38 of the staking leg portion 34 is formed in a relatively blunt point to facilitate inserting the stake 30a,b into the ground. When the support stakes 30a,b are not in use, they can be stored in the supportive backing 14 in storage holes 40 located along the top edge of the mirror. Additionally, the pivotally attached support leg 50 can be extended, as shown in FIG. 1C, to support the mirror in a lean-to fashion. In this position, the support stakes 30 can be inserted through the staking holes 32 if desires; however the support leg 50 along can provide sufficient support for the mirror on its own. When the support leg 50 is not in use, it is collapsed into a recess 52 so that the leg and the back of the mirror form a relatively flush surface.

As shown in FIG. 3A, a modified version of support stake 30, shown in FIG. 3B, includes a novelty handle 36' in the shape of a golf ball. The staking leg 34' is substantially the same as in the first support stake 30, and as such the modified support stake 30' can also be stored in the storage holes 40 found along the top edge of the mirror.

It can be appreciated from the foregoing description of the presently preferred embodiment that modifications could be made without departing from the spirit or scope of the invention disclosed herein.

What is claimed is:

1. A practice mirror for improving athletic skills, said practice mirror comprising:
   reflective means for viewing a reflection image;
   image alignment means for comparing the alignment of said reflection image to an ideal alignment;
   support means for supporting said reflective means in a substantially upright position, such that a participant can position his body in front of said practice mirror and observe his body alignment as he practices the body movements associated with an athletic event so as to detect improper body alignment and allow for correction of improper body alignment,
   said reflective means includes:
   a thin break-resistant reflective member; and
   a rigid, lightweight backing member layered beneath said reflective member;
   said reflective member is of a generally planar construction approximately one eighth inch in thickness and is comprised of polyethyl teraphthelate and said backing member is of a generally planar construction approximately two inches in thickness and is comprised of extruded polystyrene.

2. The practice mirror of claim 1 wherein said image alignment means comprises a stance line and at least one position line, said stance and position lines creating a generally cross-hair-like alignment image on said reflective means.

3. The practice mirror of claim 1 wherein said backing member includes a support aperture, said support means includes at least one removable stake adapted to be received in said support aperture for staking said reflective means to the ground so as to fix said reflective means in a generally vertical position relative to the ground.

4. The practice mirror of claim 1 wherein said support means includes a support leg pivotally attached to said backing member, said support leg having a collapsed position and an extended position wherein said support leg supports said reflective means in a generally vertical orientation whenever said support leg is extended.

5. The practice mirror of claim 1 wherein said support means includes a support leg pivotally attached to said backing member, said support leg having a collapsed position and an extended position wherein said support leg supports said reflective means in a generally vertical position whenever said support leg is extended.

6. The practice mirror of claim 1 wherein said support means is operably associated with said backing member and having a first position for supporting said reflective means and a second position for being stored substantially within said backing member when not in use.

7. A practice mirror for improving athletic skills, said practice mirror comprising:
   reflective means for viewing a reflection image including a substantially thin break-resistant outer reflective member of a clear acrylic compound defining a generally planar reflective surface for viewing the reflective image, said reflective surface being sufficiently large enough to provide a full reflective image of a participant located in front of said reflective surface and sufficiently compact so as to be easily transported and stored by the participant;
   said reflective means further comprising a rigid, lightweight backing member of a polystyrene compound beneath said outer reflective member for supporting said outer reflective member, said reflective means including said outer reflective member and said backing member having a combined thickness of approximately two and one eighth inches whereby a durable, lightweight structure is provided which is easily transported,
   support means for supporting said reflective means in a substantially vertical position whereby the participant can view the reflective image as the participant practices the motions associated with an athletic endeavor and detect improper body alignment, allowing for correction of body alignment.

8. The practice mirror of claim 7 having a stance line and two position lines image on said reflective surface, the first and second position lines being spaced apart and intersecting said stance line so that an alignment image is defined having an upper body alignment image and a lower body alignment image.

9. The practice mirror of claim 7 wherein said outer reflective member is approximately four feet in height and two feet in width, and said backing member being generally coextensive with said outer reflective member.

10. The practice mirror of claim 7 wherein said backing member includes a support aperture, said support means includes at least one removible stake adapted to be received in said support aperture for staking said reflective means to the ground so as to fix said reflective means in generally vertical position relative to the ground.

11. The practice mirror of claim 7 wherein said backing member is comprised of extruded polystyrene, and said outer reflective member is comprised of polyethyl teraphthelate.

12. The practice mirror of claim 7 wherein said support means is operably associated with said backing member and having a first position for supporting said reflective means and a second position for being stored substantially within said backing member when not in use.

13. The practice mirror of claim 7 wherein said backing member is approximately two inches thick.

14. The practice mirror of claim 7 wherein said outer reflective member is approximately one eighth inch thick.

15. A practice mirror for improving athletic skills, said practice mirror comprising:
reflective means for viewing a reflection image;
said reflective means including a thin, break-resistant outer reflective member being of a size to generally provide a full reflective image of a participant located in front of said outer reflective member, and a rigid, lightweight backing member layered beneath and supporting said outer reflective member,
support means for supporting said reflective means in a substantially upright position such that a participant can observe body alignment and movements,
said support means being operably associated with said backing member and having a first position for supporting said reflective means and a second position for being stored substantially within said backing member when not in use, said backing member includes a support aperture, said support means includes said support means includes at least one removable stake adapted to be received in said support aperture for staking said reflective means to the ground so as to fix said reflective means in a generally vertical position relative to the ground.

16. A practice mirror for improfving athletic skills, said practice mirror comprising:
reflective means for viewing a reflection image;
said reflective means including a thin, break-resistant outer reflective member being of a size to generally provide a full reflective image of a participant located in front of said outer reflective member, and a rigid, lightweight backing member layered beneath and supporting said outer reflective member,
support means for supporting said reflective means in a substantially upright position such that a participant can observe body alignment and movements,
said support means being operably associated with said backing member and having a first position for supporting said reflective means and a second position for being stored substantially within said backing member when not in use, said backing member includes a support aperture, said support means includes at least one removable stake adapted to be received in said support aperture for staking said reflective means to the ground so as to fix said reflective means in a generally vertical position relative to the ground, said outer reflective member is approximately one eighth inch in thickness and comprised of an acrylic compound and said backing member is approximately two inches in thickness and comprised of a polystyrene material.

* * * * *

UNITED STATES PATENT AND TRADEMARK OFFICE
CERTIFICATE OF CORRECTION

PATENT NO. : 5,270,871
DATED : December 14, 1993
INVENTOR(S) : Raymond J. Florian It is certified that error appears in the above-identified patent and that said Letters Patent is hereby corrected as shown below:

Col. 3, line 8, delete "along" and substitute therefor --alone--.

Col. 6, line 1, Claim 16, delete "improfving" and substitute therefor --improving--.
Col. 4, line 51, Claim 10, delete "removible" and substitute therefor --removable--.

Signed and Sealed this

Tenth Day of May, 1994

Attest:

BRUCE LEHMAN

Attesting Officer

Commissioner of Patents and Trademarks